United States Patent [19]

Eisenberg

[11] Patent Number: 4,555,986
[45] Date of Patent: Dec. 3, 1985

[54] CAGE ROTISSERIE

[75] Inventor: Morris L. Eisenberg, Lee, Mass.

[73] Assignee: Robert F. Cimini, Lee, Mass. ; a part interest

[21] Appl. No.: 589,748

[22] Filed: Mar. 15, 1984

[51] Int. Cl.⁴ .............................................. A47J 37/04
[52] U.S. Cl. ...................................... 99/427; 99/449;
99/450; D7/338; D7/409
[58] Field of Search ..................... 99/426, 427, 421 H,
99/421 HH, 421 R, 443 R, 449, 450; 426/523;
126/25 AA; D7/402, 409, 338, 347, 354

[56] References Cited

U.S. PATENT DOCUMENTS

| 504,256 | 8/1893 | Strong . | |
|---|---|---|---|
| 559,720 | 5/1896 | Lacroix . | |
| 1,741,400 | 12/1929 | Bocchino . | |
| 2,374,302 | 4/1945 | Orkfritz . | |
| 2,514,281 | 7/1950 | Hobbs . | |
| 2,638,841 | 5/1953 | Boyce . | |
| 2,882,812 | 4/1959 | Greenwald | 99/427 |
| 2,897,776 | 8/1959 | Black et al. . | |
| 3,224,362 | 12/1965 | Kozar . | |
| 3,812,776 | 5/1974 | Kean | 99/449 X |
| 3,922,961 | 12/1975 | Case | 99/450 X |
| 4,063,496 | 12/1977 | Kozikowski . | |
| 4,369,697 | 1/1983 | Millington | 99/449 X |

FOREIGN PATENT DOCUMENTS 0607906 12/1978 Switzerland ........................ 99/427

Primary Examiner—Billy J. Wilhite
Attorney, Agent, or Firm—Penrose Lucas Albright

[57] ABSTRACT

A rotisserie consisting of a rotating cylindrical cage and two baskets which are connected to such cage to rotate with it and within it. The baskets are weldments having facing open circular ends with the diameter of one greater than the other so they can be telescoped together and secured in a number of relatively spaced positions for holding meat. The cage has six bars sixty degrees apart and is opened by removing two of the adjacent bars which are readily removable for that purpose. The baskets each have inner cylindrical parts and outer conical parts and are adjustably secured to the cage via central rods only at the apex of each conical part. The entire rotisserie can be readily dismantled for cleaning by loosening only five thumbscrews and two wing nuts, the latter being for the removable bars.

16 Claims, 4 Drawing Figures

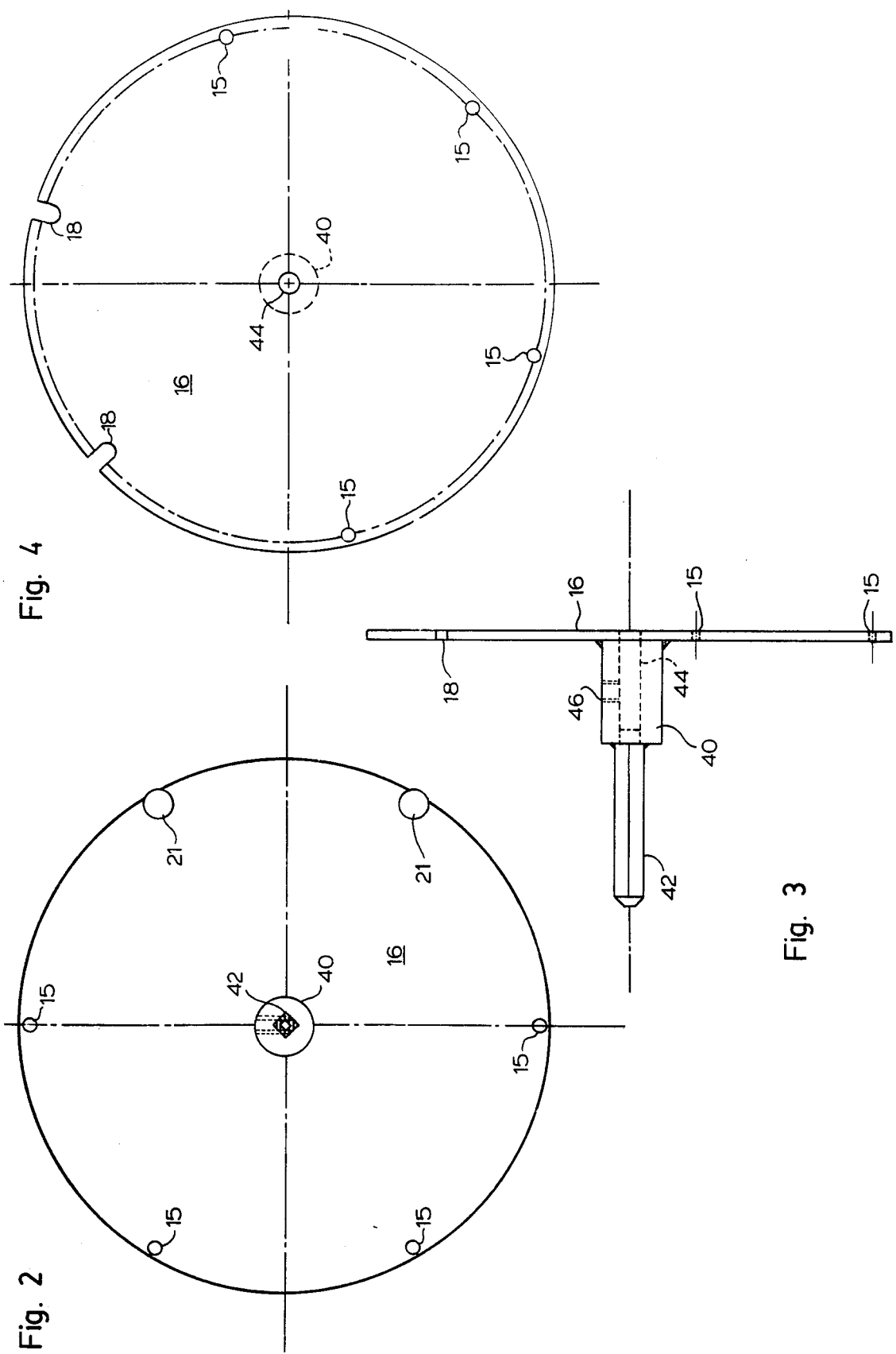

CAGE ROTISSERIE

BACKGROUND OF THE INVENTION

This invention relates to a culinary utensil and, in particular, to a culinary utensil known as a rotisserie for supporting meat in an open framework which is slowly rotated over a fire or the like.

In barbecuing meat, including fowl, roasts and other foods, it is common to rotate same slowly over hot coals, fire or other sources of heat to obtain an evenly cooked piece of meat. There are a number of devices on the market and disclosed in previously issued U.S. patents for this purpose. A common means of retaining the meat is by skewering it on a spit and employing some further mechanism to prevent the meat's disengagement from the spit. An example is shown in the Roasting Pan Spit Device of E. Bocchino, U.S. Pat. No. 1,741,400 which issued Dec. 31, 1929. A more recent example is the Culinary Utensil of E. Kozikowski, disclosed in U.S. Pat. No. 4,063,496 of Dec. 20, 1977.

It is considered advantageous to avoid piercing the meat with a spit or skewer and, in view thereof, a basket device for supporting and confining a roast or the like in a rotisserie is disclosed in the patent issued to M. Greenwald on Apr. 21, 1959, U.S. Pat. No. 2,882,812. For outdoor barbecues provided with rotary spits, a basket device with a spit is disclosed in U.S. Pat. No. 3,224,362 of Dec. 21, 1965 to J. Kozar.

There are several problems with cooking devices of type involved aside from the obvious ones such as maintaining cleanliness and ensuring that the meat is adequately secured. These exist largely because apparatus must be adaptable to a number of different types of meats, having different consistencies and distinctive configurations. In all cases, it is desirable that the meat be held firmly, centered reasonably well on the device and have means to prevent or at least restrict relative movement parts such as, for example, wings of a fowl.

Other U.S. Patents which suggest various approaches to the above problems and are indicative of the state of the art are U.S. Pat. Nos. 504,256; 559,720; 2,374,302; 2,638,841; and 2,897,776.

SUMMARY OF THE INVENTION

The primary object of the instant invention is to provide an improved rotisserie which is adapted to receive a variety of different types of meats including beef, pork, lamb, fowl, etc. without piercing the meat, as such, and to ensure that the meat is reasonably balanced in the rotisserie even if it shrinks. A further object of the invention is to restrict the movement or possibility that loose pieces of meat will have undesirable movements relative to the remainder of the meat and, in any event, are unlikely to fall through the framework of the rotisserie on the underlying coals or fire. This is achieved by providing an outer cage which can be opened and two basket like holders which are tapered on their outer end parts and cylindrical on the inner facing parts with one of the facing parts being of smaller diameter than the other so that they can telescope one in the other. Both baskets can be adjusted laterally on their supports, one about four inches and the other one considerably more for different sizes of meats. This capacity and the tapered end portions of the baskets cooperate to center the meat over the heat source. For smaller pieces of meat, the baskets overlap in their telescoped positions and this further restricts the possibility that parts of the meat may somehow come loose from the remainder of the meat and fall into the fire. The outer cage acts as a guard to ensure that the meat is not placed too close to the coals or fire and as an additional obstruction should the meat accidentally fall from the baskets—particularly when being inserted or removed from the rotisserie. The invention is of particularly sturdy construction while, at the same time, it can be easily removed from its location over the coals, dismantled and cleaned. Other objects, adaptabilities and capabilities of the invention will be appreciated from the following description of same, reference being had to the accompanying drawings in which:

BRIEF DESCRIPTION OF THE DRAWINGS

FIG. 2 is a sectional view taken on lines 2—2 of FIG. 1 which illustrates, in particular, one of the end plates for the outer open framework of the invention;

FIG. 3 is a side elevation view of the end plate shown in FIG. 2; and

FIG. 4 is a view of such end plate as seen in the direction of arrow 4 in FIG. 3.

DESCRIPTION OF THE PREFERRED EMBODIMENT

Figure 1:
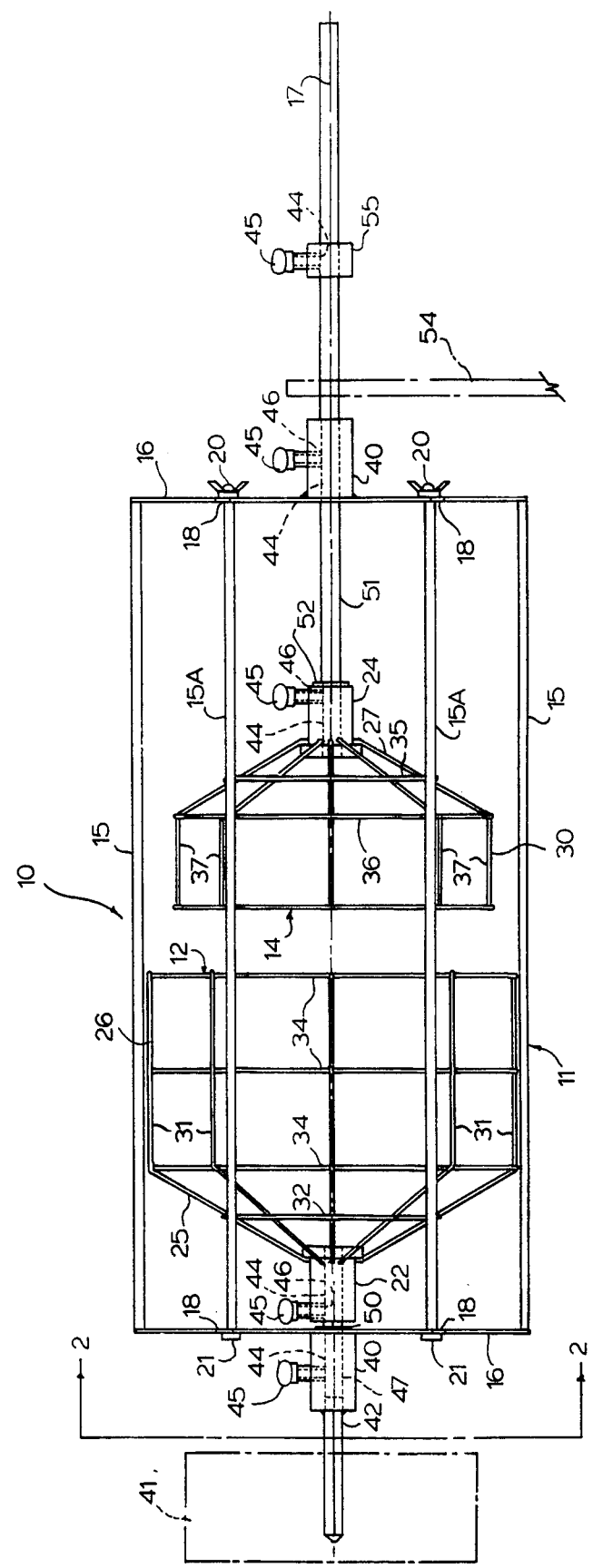
FIG. 1 is a side elevation view of the rotisserie assembly embodying the present invention.

Referring to the Figures, the rotisserie designated generally by reference numeral 10 comprises an open framework or cage 11 and, coaxially within cage 11, two weldment baskets 12 and 14 with their open sides facing each other.

Cage 11 has six side rods 15 which are firmly secured at their opposite ends to a pair of spaced apart end discs or end plates 16. Side rods 15 are arranged to plates 16 in a manner whereby they contain the surface of a right circular cylinder having the same longitudinal axis as the axis of rotation 17 for cage 11. Rods 15 are angularly spaced apart 60° and all but two of the rods are permanently affixed to end plates 16. The latter two rods designated 15A are removable by way of wing nuts 20 which engage threaded ends thereof, such removable rods 15A having heads 21 on their opposite ends which engage the outer surfaces of a corresponding end plate 16. As seen best in FIG. 4, each end plate 16 has two slots 18 for receiving rods 15A and heads 21.

Basket 12 is rigidly connected to and supported at its axis of rotation 17 by a coupling member 22 and in a like manner basket 14 is rigidly connected to, and supported at axis of rotation 17, by a coupling member 24. Basket 12 comprises an outer conical part 25 and an inner cylindrical part 26. Basket 14 also comprises an outer conical part 27 and an inner cylindrical part 30. In basket 12 there are eight struts 31 which, in the conical part 25 contain the surface of a right circular cone and in their cylindrical part 26 contain the surface of a right circular cylinder, such cone and cylinder having an axis of generation which coincides with axis of rotation 17. Welded to struts 31 are four circular rings designated 32 and 34, there being only one ring 32 welded to the conical part of struts 31 and three rings 34 of identical diameter welded to the insides of struts 31 in their cylindrical part. It is to be particularly noted that rings 34 are welded on the interior sides of struts 31 whereas ring 32 is welded to the exterior or outboard sides of struts 31. In contrast, the smaller basket 14 has three rings designated by reference numerals 35 and 36. Ring 35 is identical to ring 32 and welded to the conical part of struts 37 whereas the two rings 36 are larger than ring 35 and smaller than rings 34, and are welded to the outboard edges of struts 37 in the cylindrical part of basket 14.

In the conical parts, struts 37 contain a right circular cone and in the cylindrical part of basket 14, they contain a cylinder, such cone and cylinder having axes of generation which coincide with axis of rotation 17. As indicated previously, struts 31 and 37 are rigidly secured to coupling members 22 and 24 respectively by welding or other suitable securing means.

End plates 16 each have welded thereto a coupling boss 40 and welded at the outer end of the boss 40 to be engaged by a motor 41 is a drive stud 42. Motor 41 is an electric spit motor which is energized by electricity from a suitable source of current and is well known and available commercially. It drives a rotating component having a recess which mates with the square cross section of drive stud 42. To rotate the rotisserie, stud 42 is received in such recess and is rotated by electric motor 41 through suitable speed reducing gears.

Each boss 40 and coupling members 22 and 24 have a centrally located axial circular channels 44 which are aligned and are of the same diameter. A fastening or securing means comprising a thumbscrew 45 is threadably received by a threaded opening 46 and extends at right angles into channel 44 so that the longitudinal axis of each thumbscew 45 and each opening 46 intersects the axis of rotation 17 in the corresponding channel 44.

Channels 44 in coupling member 22 and its adjacent boss 40 are aligned to receive snugly, but at the same time slideably, a shaft 47 having a circular flange 50 welded centrally thereto. By tightening thrumbscrew 45 for such boss 40 against shaft 47, such shaft rotates with drive stud 42. Coupling member 22 is then slideable within limits along shaft 47 and is secured thereto by its thumbscrew 45 being tightened against shaft 47 at the desired location. This causes coupling member 22 together with basket 12 affixed thereto to rotate with shaft 47. Coupling member 24 and its adjacent boss 40 receive snugly but slideably in their aligned channels 44 a relatively long shaft 51 having a circular flange 52 welded thereto at its inner aspect spaced outwardly, however, about 1.562 inches from its innermost end. Flange 52 abuts against coupling member 24 and shaft 51 is rigidly secured to coupling member 24 by means of thumbscrew 45 being tightened to bear against same. Supporting long shaft 51 is a standard 54 which, in the same respect as motor 41, is well known in the art for supporting spits and has a notch at its upper end to receive shaft 51. Closely adjacent standard 54, boss 40 is rigidly secured to shaft 51 by tightening thumbscew 45. This also causes shaft 51 to rotate with cage 11 which in turn is rotated by drive stud 42 via the boss 40 rigidly connected thereto.

By loosening thumbscrew 45 of boss 40 adjacent standard 54, the lateral position of basket 14 within cage 11 is readily adjustable by sliding shaft 51 in either direction as desired. However, to prevent basket 14 from being moved too far to the left as seen in FIG. 1, an adjusting collar 55 is provided which has a channel 44 and thumbscrew 45 similar to those previously described. By adjusting the position of adjusting collar 55 on the outer end of shaft 51 and securing same on such outer end as desired by thumbscrew 45, movement of shaft 51 to the left as seen in FIG. 1 is limited by adjusting collar 55 engaging standard 54.

In the embodiment involved, the maximum movement or adjustment of baskets 12 and 14 from a minimum fully closed position to a maximum fully opened position is about ten inches. In the minimum fully closed position, the facing ends of coupling members 22 and 24 are about five inches apart and in the maximum fully opened position, they are about fifteen inches apart. In the minimum fully closed position, it will be appreciated that basket 14 telescopes with, or is received within, basket 12.

The operation of the invention will be readily apparent to those skilled in the art in consideration of the foregoing. However, briefly, rods 15A are removed and the thumbscrew 45 which is normally adjacent standard 54 is loosened to open the distance between the baskets 12 and 14. The meat, say a roast, is then placed in basket 12 and held against the face of coupling member 22 or, in any event, against the conical part 25 of basket 12. Basket 14 is then slid so that its conical part or the face of coupling member 24 bears against the roast at least sufficiently to retain it by the natural resiliency of the roast and its thumbscrew 45 is tightened against the long shaft 51. This can be accomplished either with the rotisserie located so that the drive stud 42 is received by motor 41 and long shaft 51 is received by standard 54, or the rotisserie 10 can be somewhere else; later to be placed in such disposition. The rods 15A are then placed in position in slots 18 and wing nuts 20 are tightened. With the rotisserie 10 in place shown in FIG. 1, motor 41 is energized and, hot coals or a fire having previously been placed under rotisserie 10, the roast is slowly rotated over same by motor 41 and is confined within baskets 12 and 14 and also within cage 11. The open framework of cage 11 and the weldment structure of baskets 12 and 14 permits the roast to be observed at all times and to be basted as desired. When the roast is sufficiently cooked, the entire rotisserie 10 may be removed from motor 41 and standard 54 or left in place, as desired, and wing nuts 20 are loosened to remove rods 15A. At such time, thumbscrew 45 for boss 40 which is normally adjacent standard 54 is loosened and basket 14 is moved to the right as seen in FIG. 1 to remove the roast.

It will be appreciated that rotisserie 10 can be easily dismantled by loosening each thumbscrew 45 as well as wing nuts 20 for ease in cleansing the various components of the rotisserie 10.

The drawings are reasonable proportional and to scale for the purpose of accurately disclosing the preferred embodiment. However, it will be appreciated that the invention may be constructed in different equivalent configurations and the invention is capable of other adaptations and modifications within the scope of the appended claims.

Having thus disclosed my invention, what I claim as new and to be secured by Letters Patent of the United States is:

1. An improved rotisserie which comprises a drive stud, an end rod, means for supporting said drive stud so that said end rod is spaced from said drive stud on the same horizontal axis, and drive means for rotating said drive stud, a first basket centered on said axis and facing away from said drive stud and firmly connected to said drive stud to rotate therewith about said horizontal axis, said first basket being supported solely from said drive stud, a second basket connected to said end rod which is centered on said axis and facing toward said drive stud, said second basket being supported solely from said end rod, said baskets being constructed of metal wire and so configured that the open face of one basket may be received telescopically within the open face of the other and at least one of said baskets is selectively movable while centered on said axis towards the other said basket so that said two baskets can graspingly receive and hold meat between them.

2. A rotisserie in accordance with claim 1 wherein said baskets comprise weldments of said metal wire, each said weldment having a first connecting part wherein said wires are contained in a conical surface and a second part extending a distance inwardly at least as far as said first part extends inwardly wherein said wires are contained in a cylindrical surface.

3. A rotisserie in accordance with claim 1 comprising a cage which surrounds said baskets and is rotated therewith.

4. A rotisserie in accordance with claim 4 wherein said cage comprises circular end plates and a plurality of rods connecting said end plates.

5. A rotisserie in accordance with claim 4 wherein there are at least six of said rods, all of said rods except two being affixed to said end plates in opposite ends, said two rods being adjacent to each other and readily removable from said end plates for insertion or removal of meat between said baskets.

6. A rotisserie in accordance with claim 5 wherein there are six said rods which are angularly spaced apart about sixty degrees and which lie in a cylindrical surface.

7. A rotisserie in accordance with claim 3 which comprises of fixing means of said cage which secure said cage to said second basket for causing same to rotate with said first basket.

8. An improved rotisserie which comprises means for receiving and holding meat wherein such means includes two axially aligned parts which are relatively movable together to retain the meat between them and relatively movable apart to release the meat, a cage surrounding said meat receiving and holding means, said cage connected to said parts, and drive means for rotating said cage together with said parts and meat retained by said parts within said cage, said parts comprising baskets so constructed so that one can telescope into the other, said cage further comprising end discs and connecting parallel rods, at least two adjacent of said rods being readily removable to permit insertion and removal of meat between said baskets.

9. An improved rotisserie in accordance with claim 8 where there are six said rods which are spaced sixty degrees and equal distances apart.

10. An improved rotisserie in accordance with claim 8 wherein said baskets are weldments, each said basket having an inner part which substantially coincides with the surface of a cylinder and an outer part which substantially coincides with the surface of a cone, each said cylinder and each said cone having coinciding longitudinal axes, said inner part and said outer part of each basket having a common axis of rotation which coincides with the longitudinal axes of said cylinder and cones.

11. A rotisserie in accordance with claim 10 wherein said cage comprises intervening connective means, said two end discs connected by said intervening connective means, readily removable securing means securing each said basket to a respective end disc, at least one said securing means including a rod so that said baskets can be relatively moved towards or away from each other and secured at any selected position therealong.

12. A rotisserie in accordance with claim 11 wherein an adjustable stop means is selectively secured on said rod to limit said relative movement of said baskets towards and away from each other.

13. An improved rotisserie which comprises: a cage comprising two spaced apart end plates, each having a central coupling member affixed thereto, a drive stud affixed to one said coupling member which is adapted to be rotated, an open framework, said end plates connected to each other at their peripheries by said open framework; two baskets in said cage between said end plates and surrounded by said framework, means which supportedly connects one said basket to said one coupling member to rotate therewith and further means which slideably connects said other basket to said other coupling members so such other basket may be selectively moved towards or away from said one basket; and fastening means for fastening said other basket in a selected fixed position relative to said one basket and said other coupling member to rotate therewith, said one basket and said other basket having configurations so that one is capable of telescopically receiving the other to clamp and hold meat between said baskets while being rotated with said baskets, said cage comprising readily removable means to permit placement and removal of meat held between said baskets onto and from said cage.

14. A rotisserie in accordance with claim 13 wherein said framework comprises a plurality of rods, said readily removable means comprising some of said rods which are readily removable to permit the placement and removal of meat between said baskets.

15. A rotisserie in accordance with claim 14 wherein said baskets comprise weldments.

16. A rotisserie in accordance with claim 15 wherein said means which connect said baskets to said coupling members includes means for readily detaching either or both of said baskets for removal from said cage.

* * * * *